(12) United States Patent
Tang

(10) Patent No.: US 8,924,019 B2
(45) Date of Patent: Dec. 30, 2014

(54) CLEANING ROBOT, DIRT RECOGNITION DEVICE THEREOF AND CLEANING METHOD OF ROBOT

(75) Inventor: Jinju Tang, Suzhou (CN)

(73) Assignee: Ecovacs Robotics Suzhou Co., Ltd., Jiangsu (CN)

( * ) Notice: Subject to any disclaimer, the term of this patent is extended or adjusted under 35 U.S.C. 154(b) by 248 days.

(21) Appl. No.: 13/381,617

(22) PCT Filed: Jun. 10, 2010

(86) PCT No.: PCT/CN2010/073762
§ 371 (c)(1),
(2), (4) Date: Dec. 29, 2011

(87) PCT Pub. No.: WO2011/000256
PCT Pub. Date: Jan. 6, 2011

(65) Prior Publication Data
US 2012/0103367 A1    May 3, 2012

(30) Foreign Application Priority Data
Jul. 3, 2009    (CN) .......................... 2009 1 0150110

(51) Int. Cl.
*A47L 11/00*     (2006.01)
*A47L 9/28*      (2006.01)
*G05D 1/02*      (2006.01)

(52) U.S. Cl.
CPC ............ *A47L 9/2852* (2013.01); *A47L 9/2805* (2013.01); *G05D 1/0246* (2013.01); *A47L 2201/06* (2013.01); *G05D 2201/0203* (2013.01); *Y10S 901/47* (2013.01)
USPC ................... 700/259; 700/253; 134/18; 15/3; 382/103; 901/47

(58) Field of Classification Search
CPC ..... A47L 9/2805; A47L 9/281; A47L 9/2815; A47L 9/2826; A47L 9/2852; A47L 9/2857; A47L 11/00; A47L 11/24; A47L 11/28; A47L 11/29; A47L 11/32; A47L 2201/00; A47L 2201/04; A47L 2201/06; G05D 1/0246; G05D 2201/0203; G05D 2201/0207; G05D 2201/0208; G05D 2201/0215

USPC ................ 700/245, 250, 253–254, 257–259; 701/23, 27–28; 134/18, 21; 15/3, 15/300.1, 319, 339; 382/103, 108, 169; 901/1, 46–47
See application file for complete search history.

(56) References Cited

U.S. PATENT DOCUMENTS 5,613,261 A * 3/1997 Kawakami et al. ............... 15/98
6,466,684 B1 * 10/2002 Sasaki et al. .................. 382/104

(Continued)

FOREIGN PATENT DOCUMENTS

CN       1563891 A     1/2005
CN     201543633 U     8/2011

OTHER PUBLICATIONS

JP 2003-149166 A Translation.*

(Continued)

*Primary Examiner* — Thomas G Black
*Assistant Examiner* — Ce Li
(74) *Attorney, Agent, or Firm* — Nixon Peabody LLP

(57) ABSTRACT

A cleaning robot a dirt recognition device thereof and a cleaning method of the robot are disclosed. The recognition device includes an image collecting module and an image processing module. The image collecting module may be used for collecting the image information of the surface to be treated by the cleaning robot and sending the image information to the image processing module. The image processing module may divide the collected image information of the surface to be treated into N blocks, extract the image information of each block and process the image information in order to determine the dirtiest surface to be treated that corresponds to one of the N blocks. Through the solution provided by the present invention, the cleaning robot can make an active recognition to the dirt such as dust, so that it can get into the working area accurately and rapidly.

20 Claims, 9 Drawing Sheets

(56) References Cited

U.S. PATENT DOCUMENTS

| | | | |
|---|---|---|---|
| 6,657,630 B1* | 12/2003 | Kurosawa et al. | 345/475 |
| 7,805,220 B2* | 9/2010 | Taylor et al. | 700/253 |
| 7,920,941 B2* | 4/2011 | Park et al. | 700/259 |
| 8,049,902 B2* | 11/2011 | Senoo et al. | 356/614 |
| 8,335,443 B2* | 12/2012 | Koyama et al. | 399/45 |
| 8,463,018 B2* | 6/2013 | Chung et al. | 382/153 |
| 8,508,376 B2* | 8/2013 | Knox et al. | 340/628 |
| 2002/0153185 A1* | 10/2002 | Song et al. | 180/167 |
| 2002/0153855 A1* | 10/2002 | Song et al. | 318/568.12 |
| 2004/0083570 A1* | 5/2004 | Song et al. | 15/319 |
| 2004/0211444 A1* | 10/2004 | Taylor et al. | 134/18 |
| 2005/0192707 A1* | 9/2005 | Park et al. | 700/259 |
| 2007/0019181 A1* | 1/2007 | Sinclair et al. | 356/4.01 |
| 2007/0189757 A1* | 8/2007 | Steinberg et al. | 396/213 |
| 2007/0282484 A1* | 12/2007 | Chung et al. | 700/245 |
| 2008/0151233 A1* | 6/2008 | Blanke et al. | 356/237.2 |
| 2009/0074285 A1* | 3/2009 | Fujimori | 382/141 |
| 2009/0185716 A1* | 7/2009 | Kato et al. | 382/103 |
| 2009/0268031 A1* | 10/2009 | Honma et al. | 348/162 |
| 2010/0268385 A1* | 10/2010 | Rew et al. | 700/259 |

OTHER PUBLICATIONS

"Fingerprint Image Segmentation Based on D-S Evidence Theory," Chinese Journal of Computers. vol. 26, No. 7, Dated Jul. 2003 (6 pages).

* cited by examiner

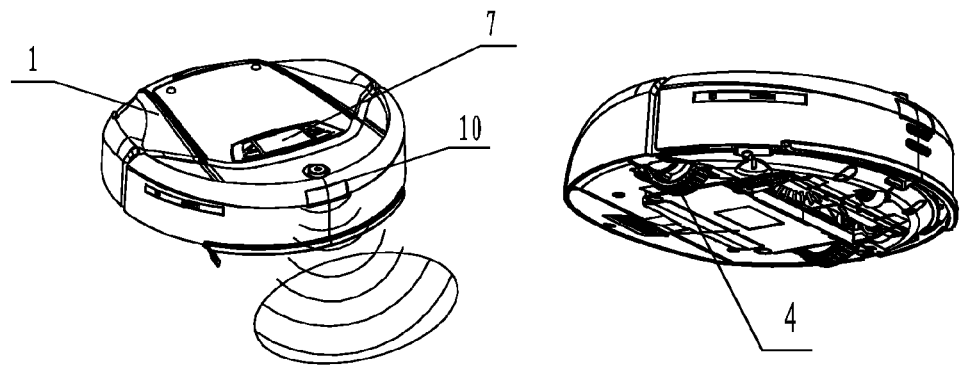
Fig 11                    Fig 12
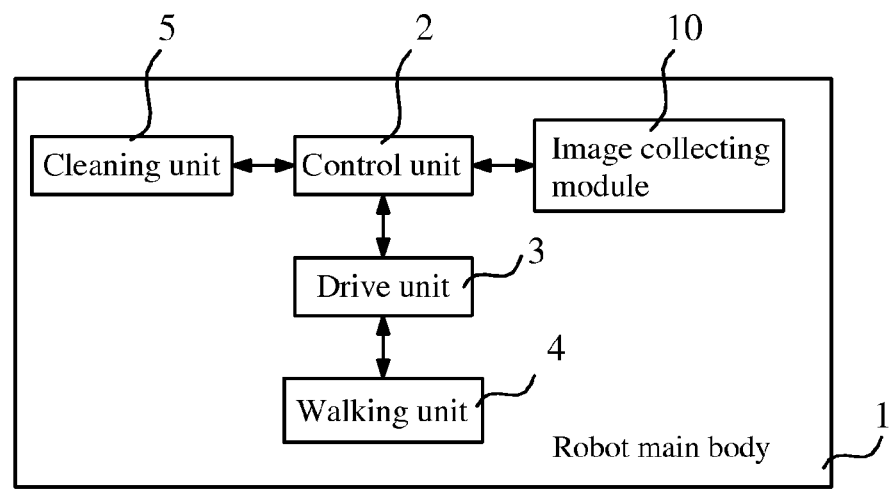
Fig 13

CLEANING ROBOT, DIRT RECOGNITION DEVICE THEREOF AND CLEANING METHOD OF ROBOT

CROSS REFERENCE TO RELATED APPLICATIONS

This application is a U.S. national stage of International Application No. PCT/CN2010/073762, filed Jun. 10, 2010, which claims priority to Chinese Application No. 200910150110.5, filed Jul. 3, 2009, each of which is incorporated entirely herein by reference.

FIELD OF THE INVENTION

The present invention relates to an intelligent device, in particular to a cleaning robot, a dirt recognition device thereof and a cleaning method of robot.

BACKGROUND OF THE INVENTION

With the time progress and the leap-forward development of science and technology, intelligent device such as robot has become a well-known term. In addition, characterized by convenient cleaning operations, time-saving and labour-saving functions, family service robots, such as intelligent cleaner and intelligent mopping machine, help the people liberate from burdensome housework and step in the family life of common people.

In the prior art of family service robots, the robots may complete the most basic dusting functions according to the requirements of people.

In the prior art, the cleaning robots are approximately classified into intelligent dust collector, intelligent sweeper and intelligent cleaner integrating the functions of dust collection and sweeping. The cleaning principle of intelligent dust collector is described as follows: Relying on the high-speed rotation of motor driven fan blades, the fan blades powerfully suck air, generating big pressure difference between inside and outside of dust collector body. Powerful air flow is generated at the suction port, so that the dust and dirt on the surface to be cleaned are sucked into the dust collecting unit of dust collector along with the air flow; through the filtering function of filter, the dust and dirt are remained in the dust collecting unit, clean air is released to the atmosphere through filter and fan blades. The cleaning principle of intelligent sweeper: A rotatable rolling brush is provided at the bottom of sweeper, through the rotation of rolling brush, such dirt as particles on the surface to be cleaned are brought into the dust collecting unit of sweeper. The cleaning principle of intelligent cleaner is: A motor which can generate vacuum effect, a fan blade and a rotatable rolling brush are set on the cleaner, through the pull of vacuum and the rotation of the rolling brush, such dirt as dust and particles on the surface to be cleaned are sucked and carried into the dust collecting unit in the cleaner. At the same power, the cleaner may generate better cleaning effect over the intelligent dust collector or intelligent sweeper.

In the process of working, the said cleaning robot may move by itself in general. When a robot, such as an intelligent cleaner, encounters such dirt as dust in its walking path, the dust sensors mounted on both sides of intake channel may detect the quantity of such dirt as dust. Under the driving force of rolling brush and the suction force, such dirt as dust enter the dust collecting box. Then, the dust sensor may compare the detected quantity of such dirt as dust between intake channels with the preset standard value, so as to determine whether it is necessary to make fixed and concentrated suction and sweeping on this cleaning point.

Thus it can be observed that, for the cleaning robot in the prior art the detection of such dirt as dust is a passive process, namely, only when the robot has met such dirt as dust, the function of detection can be played, without the function of active recognition and selection. Therefore, in making cleaning work, since such cleaning robot is unable to make active recognition to dust but move about on the surface to be cleaned in general cases, it always takes very long time to clean up the surface to be cleaned, leading to low efficiency and waste of electric energy. In order to overcome these deficiencies, it is necessary for the people to guide such cleaning robot, so that the cleaning robot can arrive at the place with such dirt as dust for cleaning. In such case, the man-made intervention is virtually added, so that it is impossible to achieve the ultimate objective of liberating the people from labor work.

In addition, there is another kind of cleaning robot which is provided with pick-up device. The pick-up device may collect the image of the ground area in front and compare this image with a standard image, so as to determine whether it is necessary to make cleaning on such area. Although this method can be used to make active detection on the area to be cleaned, the judgment method is too simple and fails to accurately determine whether the area from which the image is collected really needs cleaning, leading to high false judgment rate.

SUMMARY OF THE INVENTION

It is the technical object of the present invention to provide a cleaning robot, a dirt recognition device thereof and a cleaning method of robot, so as to overcome the deficiencies in the prior art. The present invention can make an active recognition to the dirt such as dust and accurately judge whether it is necessary to make cleaning, so as to improve the cleaning efficiency of cleaning robot, save the working time for cleaning and thus indeed help the people liberate from cleaning labor.

To address said technical problems, the present invention provides a dirt recognition device of cleaning robot, comprising an image collecting module and an image processing module;

The image collecting module may be used for collecting the image information of the surface to be treated by the cleaning robot and sending the image information to the image processing module;

The image processing module may divide the collected image of the surface to be treated into N blocks (wherein N>1), extract the image information of each block of image and process the image information in order to determine the dirtiest surface to be treated that corresponds to one of the N blocks, and consequently the device can make an active recognition to the dirt.

The second solution provided by the present invention: In the dirt recognition device of cleaning robot provided in the first solution, the image processing module comprises an image segmentation unit, an information extraction unit and a calculation unit;

The image segmentation unit may be used for dividing the collected image of the surface to be treated by the cleaning robot into N blocks, wherein N>1;

The information extraction unit may be used for extracting the image information of each block of image and sending the image information to the calculation unit;

The calculation unit may determine the dirtiest surface to be treated that corresponds to one of the N blocks of image according to the image information of each block of image. The third kind of solution provided by the present invention: In the dirt recognition device of cleaning robot provided by the second kind of solution, the information extraction unit is a gray-scale value extraction unit, and the calculation unit is a comparison unit; wherein the gray-scale value extraction unit may extract the corresponding gray-scale value from each block of image; the comparison unit may compare the gray-scale value of each block, so as to determine the image with the maximum gray-scale value as the dirtiest surface to be treated.

The fourth kind of solution provided by the present invention: In the dirt recognition device of cleaning robot provided in the second kind of solution, the information extraction unit is a gray-scale value extraction unit, and the calculation unit comprises a characteristic value extraction unit and a comparison unit; wherein the gray-scale value extraction unit may extract the gray-scale value corresponding to each block of image; the characteristic value extraction unit may convert the gray-scale value of each block into characteristic value corresponding to the gray-scale value, so as to consequently extract the dirt characteristic from each block; the comparison unit may compare the dirt characteristic value of each block and consequently determine the image with the maximum dirt characteristic value as the dirtiest surface to be treated.

The fifth kind of solution provided by the present invention: In the dirt recognition device of cleaning robot provided in the second kind of solution, the information extraction unit is a gray-scale value extraction unit, and the calculation unit comprises a characteristic extraction unit, a theoretical confidence calculation unit and a comparison unit;

wherein the gray-scale value extraction unit may extract the corresponding gray-scale value from each block; the characteristic value extraction unit may convert the gray-scale value of each block into a characteristic value corresponding to the gray-scale value, so as to extract the dirt characteristic from each block of image;

Using the characteristic value and an instantaneous confidence which is obtained from a database and corresponds to the characteristic value as parameters, the theoretical confidence calculation unit may obtain the theoretical confidence corresponding to each block of image, according to the functional relations among the characteristic value, the instantaneous confidence and the theoretical confidence; the comparison unit may compare the of each block and consequently determine the image with the maximum theoretical confidence as the dirtiest surface to be treated.

The six kind of solution provided by the present invention: The dirt recognition device of cleaning robot provided in the fifth kind of solution also comprises a dust sensor and a theoretical confidence correction unit; The dust sensor may be used for sensing the dirt quantity on the surface to be treated and sending the information on the sensed actual dirt quantity to the theoretical confidence correction unit; The theoretical confidence correction unit may calculate the difference value between actual dirt quantity and standard dirt quantity, and calculate out the deviation value of instantaneous confidence according to the functional relation between the difference value and the deviation value of instantaneous confidence; according to the functional relations among the characteristic value, the instantaneous confidence and the deviation value of instantaneous confidence, the theoretical confidence calculation unit calculate out the theoretical confidence corresponding to each block after correction.

The seventh kind of solution provided by the present invention: In the dirt recognition device of cleaning robot provided in the sixth kind of solution, the comparison unit may compare the theoretical confidence of each block of image after correction and determine the image with the maximum theoretical confidence as the dirtiest surface to be treated. The eighth kind of solution provided by the present invention: In the dirt recognition device of cleaning robot provided by the fifth kind of solution, the functional relations among the characteristic value, the instantaneous confidence and the theoretical confidence is: $P_A = AF_A$ Wherein, A represents the characteristic value; $F_A$ represents the instantaneous confidence when the characteristic value is A; $P_A$ represents the theoretical confidence when the characteristic value is A. The ninth kind of solution provided by the present invention: In the dirt recognition device of cleaning robot provided in the sixth kind of solution, the functional relation between the difference value (between actual dirt quantity and standard dirt quantity) and the deviation value of instantaneous confidence is described as follows:

$$\Delta F_{A(n)} = f(x)$$

X represents the difference value between actual dirt quantity and standard dirt quantity; $\Delta F_{A(n)}$ represents the deviation value of instantaneous confidence when the characteristic value is A after nth correction, and f represents the functional relation expression;

Based on the following formula, the theoretical confidence calculation unit may calculate out the theoretical confidence corresponding to each block of image after correction:

$$P_{A(n)}' = A(F_A + \Delta F_{A(n)} + \Delta F_{A(n-1)} + \ldots \Delta F_{A(1)})$$

Wherein, A represents the characteristic value; $F_A$ represents the instantaneous confidence when the characteristic value is A; $\Delta F_{A(n)}$ represents the deviation value of instantaneous confidence that corresponds to the difference value between actual dirt quantity and standard dirt quantity at the time of nth correction; $\Delta F_{A(n-1)}$ represents the deviation value of instantaneous confidence that corresponds to the difference value between actual dirt quantity and standard dirt quantity at the time of (n−1) th correction; ... $\Delta F_{A(1)}$ represents the deviation value of instantaneous confidence that corresponds to the difference value between actual dirt quantity and standard dirt quantity at the time of the 1st correction; $P_{A(n)}'$ represents the theoretical confidence when the characteristic value is A after the nth correction.

The tenth kind of solution provided by the present invention: In the dirt recognition device of cleaning robot provided in the ninth kind of solution, the functional relation expression of f in $\Delta F_{A(n)} = f(x)$ is represented as follows:

$$\Delta F_{A(n)} = a_n X^n + a_{n-1} X^{n-1} + a_{n-2} X^{n-2} + \ldots + a_1 X^1 + a_0$$

Wherein, X represents the difference value between actual dirt quantity and standard dirt quantity; $\Delta F_{A(n)}$ represents the deviation value of instantaneous confidence when the characteristic value is A after the nth correction; $a_n, a_{n-1}, \ldots, a_1, a_0$ represent multiple factors.

The eleventh kind of solution provided by the present invention: The dirt recognition device of cleaning robot provided in the fifth kind of solution also comprises the database, and the database stores the characteristic value, the instantaneous confidence, the initial confidence and the theoretical confidence which correspond to each other.

The twelfth kind of solution provided by the present invention: The dirt recognition device of cleaning robot provided in the sixth kind of solution also comprises the database, and the database stores the characteristic value, the instantaneous confidence, the initial confidence, the deviation value of instantaneous confidence, the theoretical confidence and the threshold value of standard dirt quantity which correspond to each other.

The thirteenth kind of solution provided by the present invention: In the dirt recognition device of cleaning robot provided in the eleventh or the twelfth kind of solution, the value of the instantaneous confidence corresponding to the initial characteristic value is equivalent to the value of initial confidence.

The fourteenth kind of solution provided by the present invention: The dirt recognition device of cleaning robot provided in the sixth kind of solution also comprises a setting unit, which may be used for setting up initial confidence and/or the threshold value of standard dirt quantity. The fifteenth kind of solution provided by the present invention: In the dirt recognition device of cleaning robot provided in the fourteenth kind of solution, the setting unit is a press key, a knob, a touch or remote control type device. The present invention also provides a cleaning robot, comprising a robot main body, a control unit, a drive unit, a walking unit and a cleaning unit, wherein the control unit may control the cleaning unit in operation and control the drive unit, so that the drive unit may drive the walking unit to walk; the cleaning robot also comprises the dirt recognition device stated in any of solutions 1-15; according to the dirtiest surface to be treated which is determined by the dirt recognition device, the control unit may determine the walking route of the walking unit with the dirtiest surface to be treated as the destination, so as to make cleaning on the dirtiest surface to be treated.

In the cleaning robot, the image processing unit in the dirt recognition device stated in any of solutions 1-15 is a component part of the control unit. The present invention also provides a cleaning method of cleaning robot; the cleaning method comprises the following steps:

Step 1: Using the image collecting module in the dirt recognition device stated in any of said solutions 1-15 to collect the image of the surface to be treated by the cleaning robot;

Step 2: Using the image processing module in the dirt recognition device as stated in any of said solutions 1-15 to divide the image into a plurality of blocks and to convert the image information of each block of image into gray-scale value;

Step 3: The image processing module may determine the dirtiest surface to be treated according to the gray-scale value;

Step 4: Driving the cleaning robot to walk to the dirtiest surface to be treated and make cleaning on the dirtiest surface to be treated.

In said cleaning method of cleaning robot, step 3 also specifically comprises the following steps:

Step 301: Converting the gray-scale value of each block of image into a characteristic value corresponding to the gray-scale value, thus extracting the dirt characteristics from each block of image;

Step 302: Comparing the characteristic value of each block of image, and determining the block with the maximum characteristic value as the dirtiest surface to be treated.

In the cleaning method of cleaning robot, step 3 may also comprise the following steps:

Step 311: Converting the gray-scale value of each block into a characteristic value corresponding to the gray-scale value;

Step 312: According to the functional relations among the characteristic value, the instantaneous confidence and the theoretical confidence, obtaining the theoretical confidence that corresponds to each block;

Step 313: Comparing the theoretical confidence of each block, and determining the block with the maximum theoretical confidence as the dirtiest surface to be treated.

In said cleaning method of cleaning robot, the functional relations among the characteristic value, the instantaneous confidence and the theoretical confidence as stated in step 312 is as follows:

$$P_A = AF_A$$

Wherein, A represents the characteristic value; $F_A$ represents the instantaneous confidence when the characteristic value is A; $P_A$ represents the theoretical confidence when the characteristic value is A.

In said cleaning method of cleaning robot, the cleaning method also comprises the following steps after step 4: Step 5: Sensing the dirt quantity on the treating surface through a dust sensor;

Step 6: Calculating the difference value between actual dirt quantity and standard dirt quantity;

Step 7: According to the functional relation between the difference value and the deviation value of instantaneous confidence, calculated out the deviation value of instantaneous confidence, and then returning to step 312; wherein the functional relation between the difference value (between actual dirt quantity and standard dirt quantity) and the deviation value of instantaneous confidence is expressed as follows:

$$\Delta F_{A(n)} = f(x)$$

X represents the difference value between actual dirt quantity and standard dirt quantity; $\Delta F_A(n)$ represents the deviation value of instantaneous confidence after the nth correction, and f represents the functional relation expression;

At this moment, the functional relation among the characteristic value, the instantaneous confidence and the theoretical confidence in step 312 is as follows:

$$P_{A(n)}' = A(F_A + \Delta F_{A(n)} + \Delta F_{A(n-1)} + \ldots \Delta F_{A(1)})$$

Wherein, A represents the characteristic value; $F_A$ represents the instantaneous confidence when the characteristic value is A; $\Delta F_{A(n)}$ represents the deviation value of instantaneous confidence that corresponds to the difference value between actual dirt quantity and standard dirt quantity at the time of nth correction; $\Delta F_{A(n-1)}$ represents the deviation value of instantaneous confidence that corresponds to the difference value between actual dirt quantity and standard dirt quantity at the time of (n−1) th correction; ... $\Delta F_{A(1)}$ represents the deviation value of instantaneous confidence that corresponds to the difference value between actual dirt quantity and standard dirt quantity at the time of the 1st correction; $P_{A(n)}'$ represents the theoretical confidence when the characteristic value is A after the nth correction.

the functional relation expression of f in $\Delta F_{A(n)} = f(x)$ is:

$$\Delta F_{A(n)} = a_n X^n + a_{n-1} X^{n-1} + a_{n-2} X^{n-2} + \ldots + a_1 X^1 + a_0$$

Wherein, X represents the difference value between actual dirt quantity and standard dirt quantity; $\Delta F_A(n)$ represents the deviation value of instantaneous confidence when the characteristic value is A after the nth correction; $a_n, a_{n-1}, \ldots, a_1, a_0$ represent multiple factors.

In the step 4, in making cleaning on the dirtiest surface to be treated, if the actual dirt quantity sensed by the dust sensor within a preset time period is less than a set value or the actual dirt quantity sensed by the dust sensor within another preset time period has been greater than a set value, terminating the cleaning on the treated surface and returning to step 1.

The cleaning method of cleaning robot as stated in any of said solutions also comprises the following steps:

Detecting the working electric quantity of the cleaning robot; if the working electric quantity is less than a preset value, stopping the cleaning work.

The cleaning method of cleaning robot as stated in any of said solutions also comprises the following step:

Detecting whether all the instantaneous confidence values have converged to the low limit value within the value range of instantaneous confidence; If all the instantaneous confidence values have converged to the low limit value within the value range of instantaneous confidence, stopping the cleaning work.

According to the present invention, the image processing module may divide the images collected b the image collecting module into N blocks, compare the image information of each of blocks and consequently determine the dirtiest surface to be treated that corresponds to one of many blocks. According to the solutions of the present invention, the cleaning robot can make an active recognition to such dirt as dust and thus accurately and quickly enter the working area for working. As compared with the prior art, the present improves the accuracy of determination and working efficiency and saves the working time; Furthermore, since no artificial intervention is required in the selection and cleaning of working area, the people are in very deed liberated from labor work. In addition, through conversion of image information into gray-scale value, there is no need to store image information, considerable storage space is saved, and the operating speed of control unit is accelerated. Furthermore, since there is no additional requirement for the memory capacity of storage unit, the procurement cost for elements/devices is also reduced.

The technical solutions of the present invention are hereinafter described in detail in combination with the attached drawings and the specific embodiments.

BRIEF DESCRIPTION OF THE DRAWINGS

FIG. 11 is the integral schematic diagram of the self-mobile cleaning robot according to the present invention;

FIG. 12 is the bottom schematic diagram of the self-mobile cleaning robot according to the present invention;

FIG. 13 is the control diagram of a specific embodiment of the self-mobile cleaning robot according to the present invention;

DETAILED DESCRIPTION OF THE PREFERRED EMBODIMENTS

The present invention provides a recognition device for achieving active recognition to dirt. The recognition device includes an image collecting module 10 and an image processing module 20; wherein the image collecting module 10 may be used for collecting the image information of the surface to be treated by the cleaning robot 1 and sending the image information to the image processing module 20. The image processing module 20 may divide the collected image of the surface to be treated into N blocks (where, N>1), extract the image information of each block and process the image information in order to finally determine the dirtiest surface to be treated that corresponds to one of the N blocks; Or, the image processing module 20 may extract the image information of each block and send the image information to the cleaning robot 1, and it is up to the cleaning robot to determine the dirtiest surface to be treated that corresponds to one of the N blocks. Wherein, the determination of the dirtiest surface to be treated that corresponds to one of the N blocks can be completed by the recognition device or the cleaning robot. The present invention is described in detail as follows through embodiments.

Figure 1:
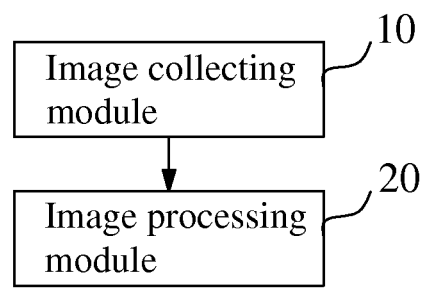
FIG. 1 is the control diagram of the recognition device which can make an active recognition to the dirt according to the present invention.
Figure 2:
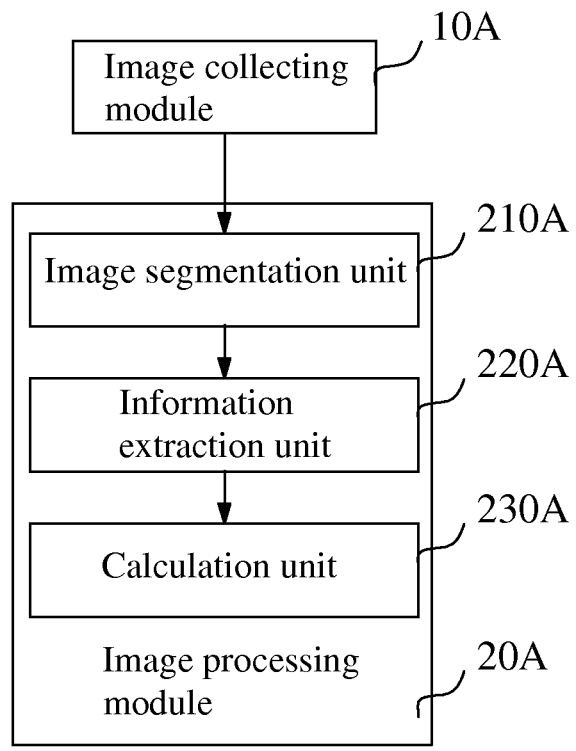
FIG. 2 is the control diagram of embodiment 1 of the recognition device which can make an active recognition to the dirt according to the present invention.
Figure 3:
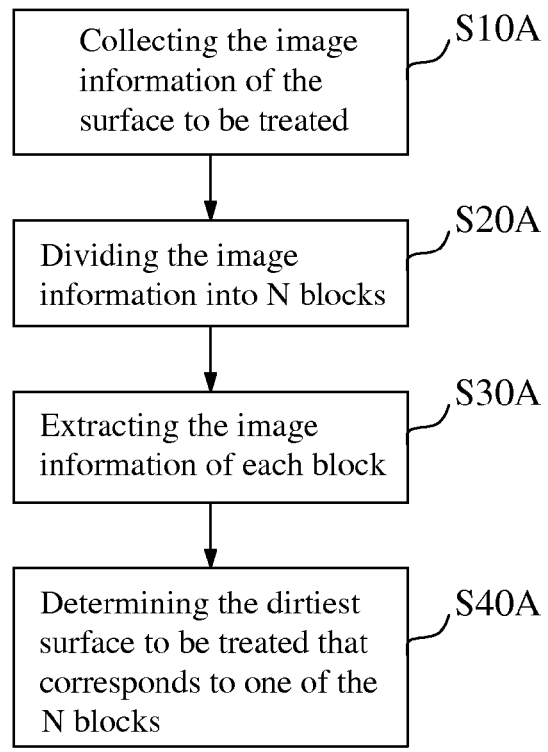
FIG. 3 is the working flow diagram of the recognition device which can make an active recognition to the dirt as shown in FIG. 2 of the present invention.

The Embodiment 1 of the Recognition Device for Realizing Active Recognition to Dirt As shown in FIG. 2, a recognition device for realizing active recognition to dirt is provided in the embodiment 1, comprising an image collecting module 10A and an image processing module 20A, wherein the image processing module 20A comprises an image segmentation unit 210A, an information extraction unit 220A and a calculation unit 230A. FIG. 3 is the working flow diagram of the recognition device.

As shown in FIG. 2 in combination with FIG. 3, after the image collecting module 10A is used for collecting the image information of the surface to be treated (Step S10A), the image segmentation unit 210A in the image processing module 20A may divide the collected image information of the surface to be treated into N blocks (where N>1) (Step S20A), the information extraction unit 220A may extract the image information of each block (step S30A) and send such image information to the calculation module 230A, and the calculation unit 230A may determine the dirtiest surface to be treated that corresponds to one of the N blocks according to the image information of each block (Step S40A).

Wherein, the information extraction unit may extract partial information such as gray-scale value and characteristic value from each block, and it is not necessary to store all the image information, so that the memory space can be greatly saved. Furthermore, since the calculation unit 230A can make determination according to these information, the operating speed is improved.

Figure 4:
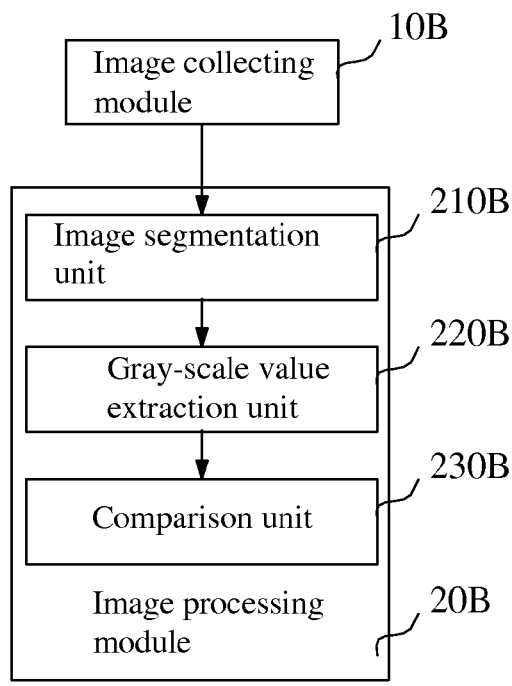
FIG. 4 is the control diagram of embodiment 2 of the recognition device which can make an active recognition to the dirt according to the present invention.
Figure 5:
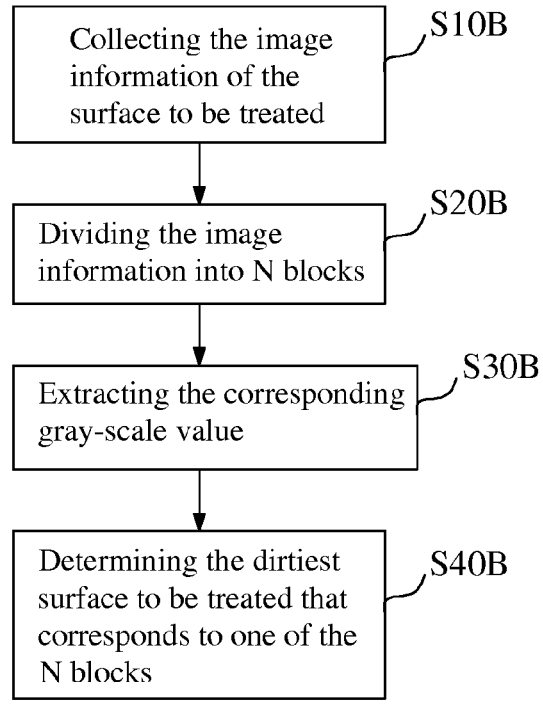
FIG. 5 is the working flow diagram of the recognition device which can make an active recognition to the dirt as shown in FIG. 4 of the present invention.

The Embodiment 2 of the Recognition Device for Realizing the Active Recognition to Dirt As shown in FIG. 4, a recognition device for realizing active recognition to dirt is provided in the embodiment 2. FIG. 5 is the working flow diagram of the recognition device which can make an active recognition to the dirt as shown in FIG. 4 of the present invention. As shown in FIG. 4 in combination with FIG. 5, the recognition device comprises an image collecting module 10B and an image processing module 20B, wherein the image processing module 20B comprises an image segmentation unit 210B, a gray-scale value extraction unit 220B and a comparison unit 230B.

The image collecting module 10B may collect the image information of the surface to be treated by the cleaning robot (Step S10B) and send such image information to the image segmentation unit 210B; the image segmentation unit 210B may divide the collected image information of the surface to be treated into N blocks according to the actual operation need (where N>1) (Step S20B); the gray-scale value extraction unit 220B may extract the corresponding gray-scale value from each block (Step S30B), then the comparison unit 230B may compare the gray-scale value of each block and consequently determine the image with the maximum gray-scale value as the dirtiest surface to be treated (Step S40B).

Wherein, the method for extracting the gray-scale value from an image is a common knowledge in the art, and the gray-scale value is within 0~255 as a rule.

In this embodiment, the magnitude of gray-scale value is used as the basis for determination. For the surfaces to be treated with the same nature, a surface with higher quantity of dirt such as dust generally has higher gray-scale value over another surface with lower quantity of dirt such as dust. Therefore, it is feasible to determine the dirtiest surface to be treated by comparing the gray-scale values.

Figure 6:
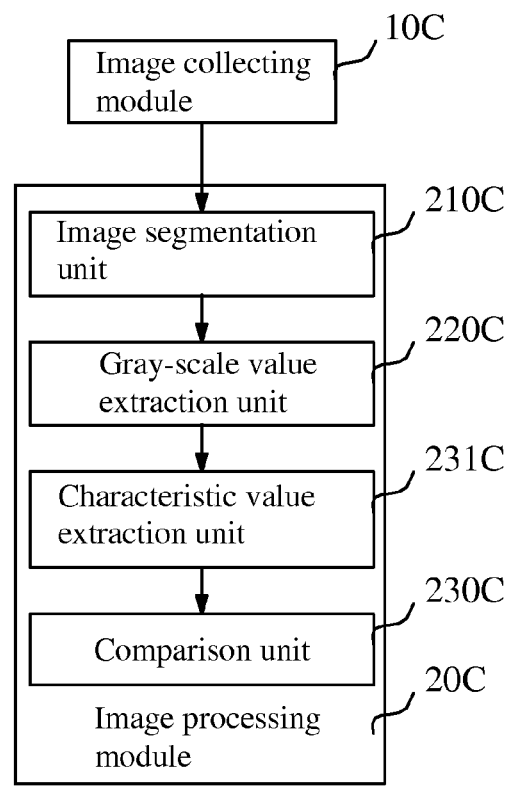
FIG. 6 is the control diagram of embodiment 3 of the recognition device which can make an active recognition to the dirt according to the present invention.

The Embodiment 3 of the Recognition Device for Realizing the Active Recognition to Dirt FIG. 6 is the principle schematic diagram of a recognition device for realizing active recognition to dirt is provided in the embodiment 3. As shown in FIG. 6, the recognition device comprises an image collecting module 10C and an image processing module 20C, wherein the image processing module 20C comprises an image segmentation unit 210C, a gray-scale value extraction unit 220C, a characteristic value extraction unit 231C and a comparison unit 230C; the characteristic value extraction unit 231C and the comparison unit 230C constitute a calculation unit.

This embodiment differs from the embodiment 1 in that: the gray-scale value is converted into the characteristic value in the characteristic value extraction unit 231C; the basis for determining the dirtiest surface to be treated is the magnitude of characteristic value, so that the surface that corresponds to the block with the maximum characteristic value is determined as the dirtiest surface to be treated.

Wherein, the statistic methods for pattern recognition, such as clustering method are used as the conversion method in this embodiment. Specifically, the information of each block is subject to preprocessing after digital segment, so as to remove the mixed interference information and reduce some deformation and distortion. Subsequently, feature extraction is made, namely a group of features are extracted from the digitalized and pre-processed input pattern. The said feature is a selected measurement, which remains constant or almost remains constant for the general deformation and distortion and merely contains redundant information as less as possible. As a common knowledge, the gray-scale value is within the range of 0~255. In this embodiment, through a pattern recognition algorithm, the value range of the characteristic value is within 0~1.

In this embodiment, the recognition device may convert the image information of each block into a gray-scale value; through the pattern recognition algorithm, different gray-scale values correspond to different characteristic values. Through comparison among different characteristic values, the recognition device may determine which is the dirtiest among the surfaces to be treated.

It is common knowledge that a digital image exists in the form of bitmap; a bitmap is a rectangular lattice; the lightness or darkness of the pixel of each point is identified by its gray-scale value. Therefore, very big memory space will be occupied by data in order to compare the gray-scale value of each of blocks. For the storage cell, quite a few loads will be added. However, in this embodiment, one or several gray-scale values of each block are captured, the captured gray-scale values are converted into characteristic values through an algorithm, so that there is no need to make gray-scale value comparison for the whole image information of each block, the memory space occupied by data is smaller, while the data reliability is even higher.

Figures 7, 8:
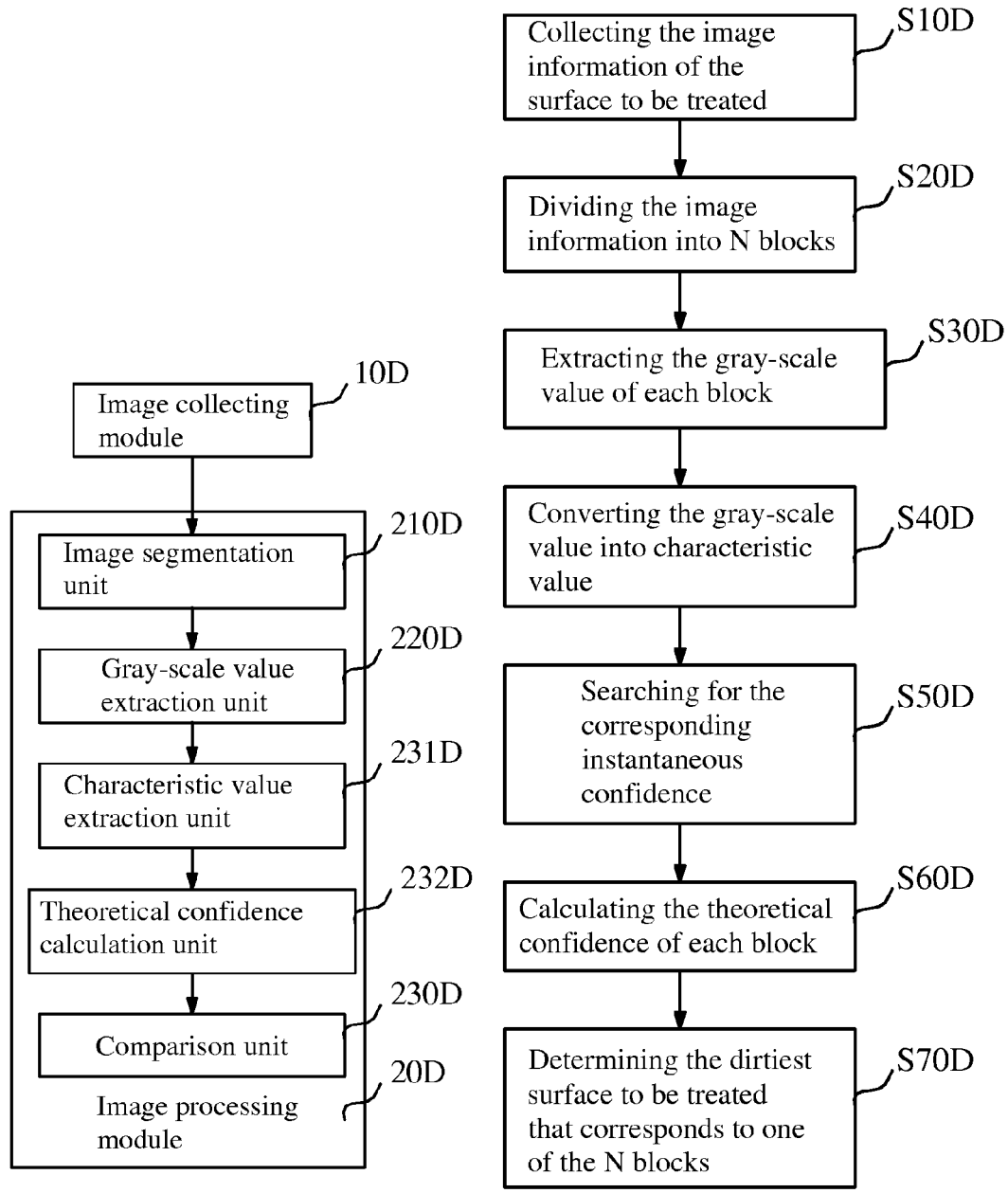
FIG. 7 is the control diagram of embodiment 4 of the recognition device which can make an active recognition to the dirt according to the present invention.
FIG. 8 is the working flow diagram of the recognition device which can make an active recognition to the dirt as shown in FIG. 7 of the present invention.

The Embodiment 4 of the Recognition Device for Realizing Active Recognition to Dirt FIG. 7 is the principle diagram of the recognition device which is provided in this embodiment 4 and can make an active recognition to the dirt. As compared with the solution of embodiment 3, a theoretical confidence calculation unit 232D is added in this embodiment 4. According to the characteristic value, the theoretical confidence calculation unit 232D may obtain from a database the instantaneous confidence that corresponds to the characteristic value, wherein the database can be either stored in the storage unit inside the recognition device or in the storage unit outside the recognition device.

Many groups of data with the characteristic values corresponding to the instantaneous confidence are stored in this database. According to a characteristic value, it is feasible to obtain an instantaneous confidence corresponding to this characteristic value through inquiry.

FIG. 8 is the working flow diagram of the device as shown in FIG. 7. The recognition method used by the recognition device is described as follows:

Step S10D: The image collecting module may collect the image information of the surface to be treated by the cleaning robot and send such image information to the image segmentation unit 210D;

Step S20D: the image segmentation unit 210D may divide the collected image information of the surface to be treated into N blocks according to the actual operation need (where N>1);

Step S30D: The gray-scale value extraction unit 220D may extract the corresponding gray-scale value from each block;

Step S40D: In the characteristic value extraction unit 231D, the gray-scale values are converted into characteristic values through pattern recognition algorithm;

Step S50D: According to the characteristic value, the theoretical confidence calculation unit 232D may search the corresponding instantaneous confidence from a database; at the initial state, the instantaneous confidence in the database is a same preset value, and the instantaneous confidence at the initial state is defined as the initial confidence;

Step S60D: According to the functional relation among the characteristic value, the instantaneous confidence and the theoretical confidence, the theoretical confidence calculation unit 232D may obtain the theoretical confidence corresponding to each block, wherein the functional relation among the characteristic value, the instantaneous confidence and the theoretical confidence refers to a conversion method, such as multiplication relation, namely $P_A=AF_A$, where A represents the characteristic value; $F_A$ represents the instantaneous confidence when the characteristic value is A; $P_A$ represents the theoretical confidence when the characteristic value is A. In this manner, it is feasible to obtain a theoretical confidence for each block;

Step S70D: the comparison unit 230D may compare the theoretical confidence of each block and consequently determine the image with the maximum theoretical confidence as the dirtiest surface to be treated.

Figure 9:
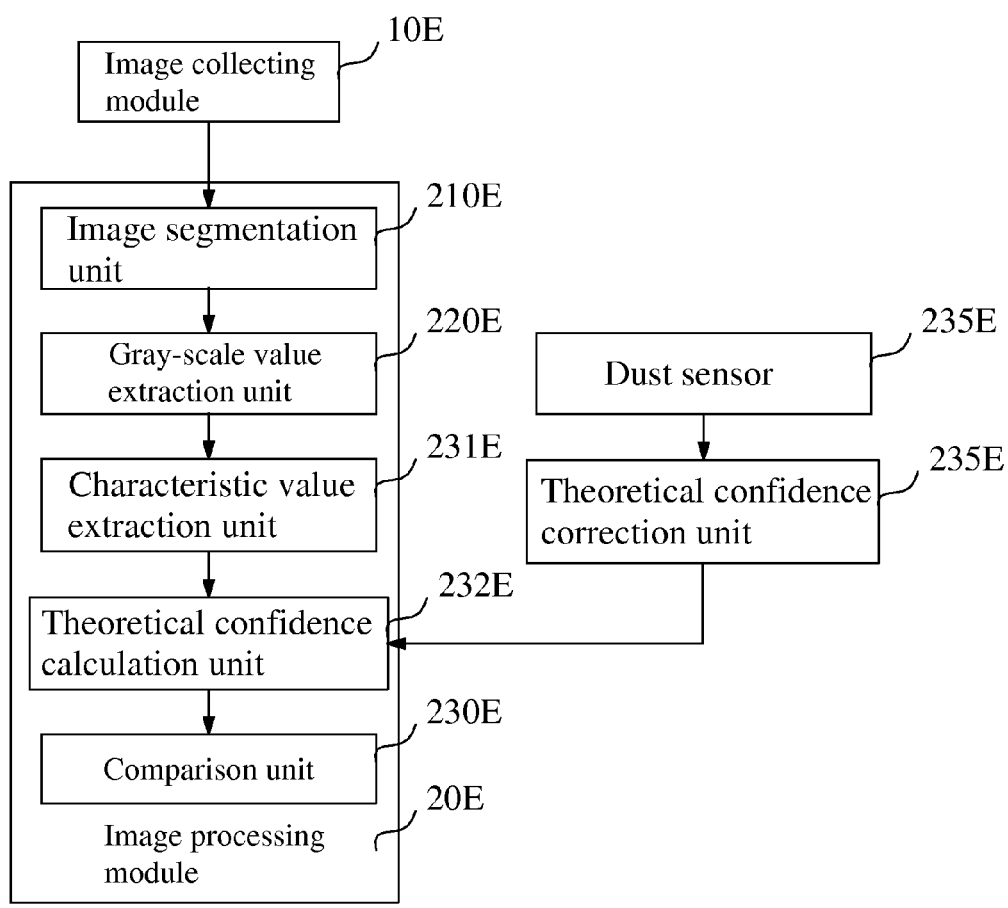
FIG. 9 is the control diagram of embodiment 5 of the recognition device which can make an active recognition to the dirt according to the present invention.
Figure 10:
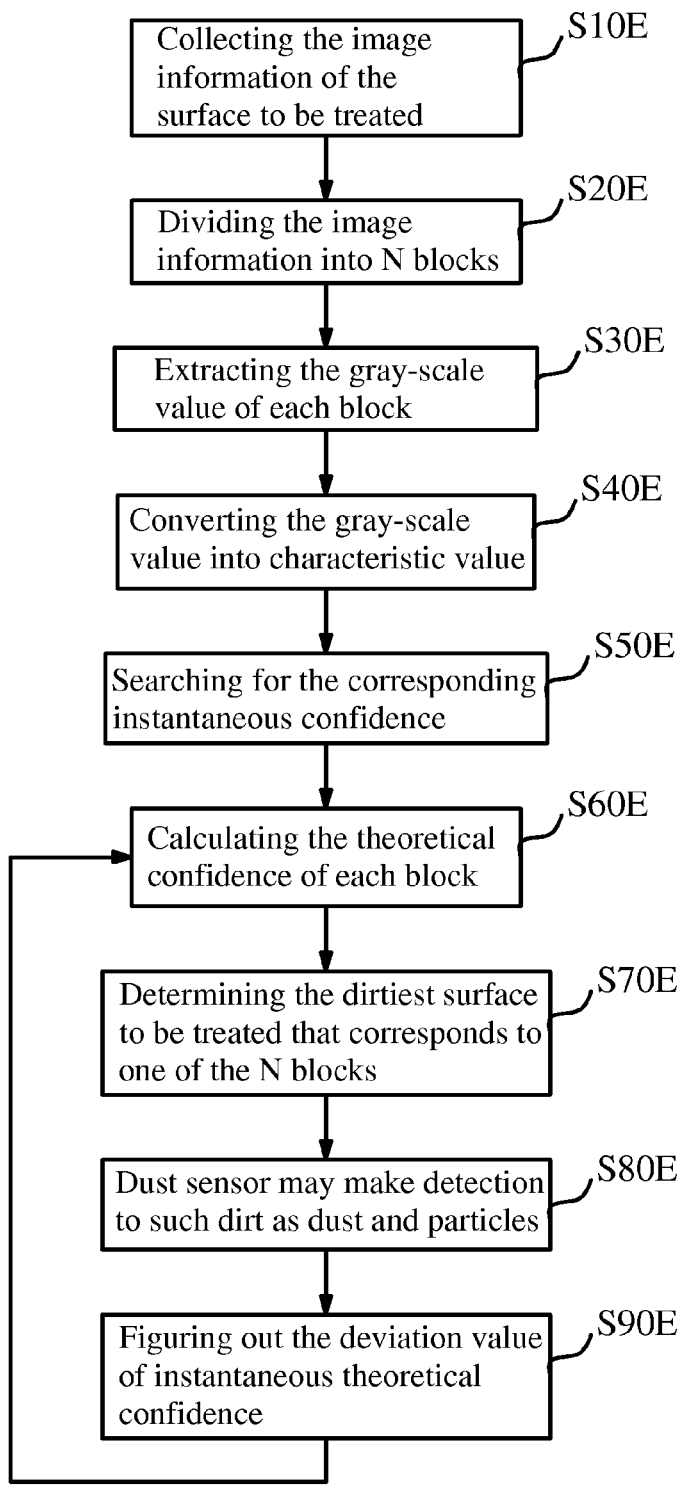
FIG. 10 is the working flow diagram of the recognition device which can make an active recognition to the dirt as shown in FIG. 9 of the present invention.
Figure 14:
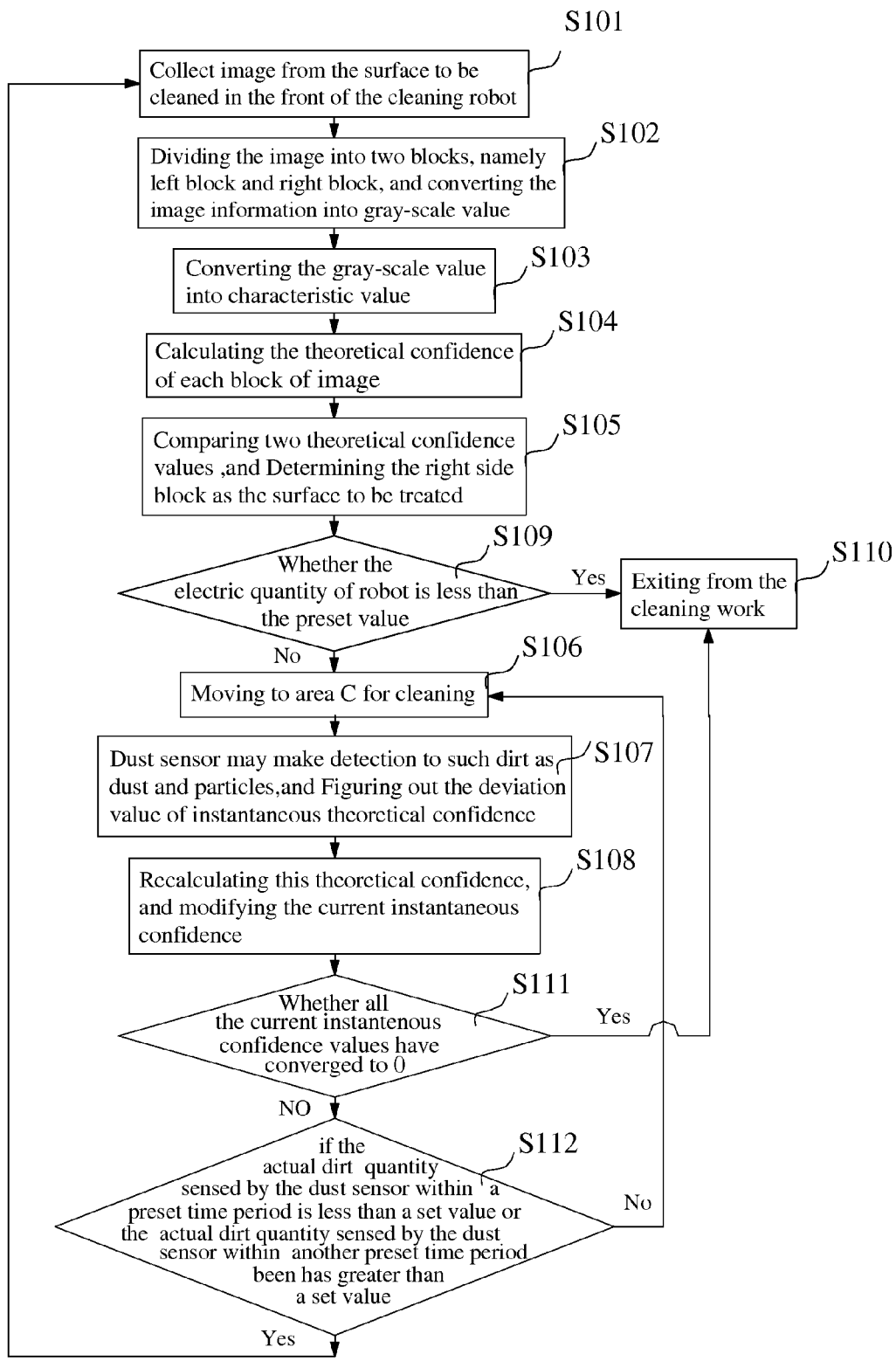
FIG. 14 is the working flow diagram of the self-mobile cleaning robot according to the present invention.

The Embodiment 5 of the Recognition Device for Realizing Active Recognition to Dirt FIG. 9 is the control diagram of embodiment 5 of the recognition device which can make an active recognition to the dirt according to the present invention; FIG. 10 is working flow diagram of the recognition device which can make an active recognition to the dirt as shown in FIG. 9;

As compared with embodiment 4, a dust sensor 235E and a theoretical confidence correction unit 236E are added in this embodiment. The dust sensor may be a infrared emission/infrared receiving transducer or sonar sensor, which may be used for sensing the dirt quantity of the surface to be treated and sending the sensed information on actual dirt quantity to the theoretical confidence correction unit 236E; the theoretical confidence correction unit 236E may be used for calculating the difference value between actual dirt quantity and standard dirt quantity; according to the functional relation between this difference value and the deviation value of instantaneous confidence, the theoretical confidence correction unit 236E may figure out the deviation value of instantaneous confidence; the theoretical confidence calculation unit 232E may use this difference value to correct the theoretical confidence finally obtained through calculation.

Step S10E: The image collecting module 10E may collect the image information of the surface to be treated by the cleaning robot and send such image information to the image segmentation unit 210E;

Step S20E: the image segmentation unit 210E may divide the collected image information of the surface to be treated into N blocks according to the actual operation need (where N>1);

Step S30E: The gray-scale value extraction unit 220E may extract the corresponding gray-scale value from each block;

Step S40E: In the characteristic value extraction unit 231E, the gray-scale values are converted into characteristic values through pattern recognition algorithm;

Step S50E: According to the characteristic value, the theoretical confidence calculation unit 232E may search the corresponding instantaneous confidence from a database; at the initial state, the instantaneous confidence in the database is a same preset value, and the instantaneous confidence at the initial state is defined as the initial confidence;

Step S60E: According to the functional relation among the characteristic value, the instantaneous confidence and the theoretical confidence, the theoretical confidence calculation unit may obtain the theoretical confidence corresponding to each block;

Step S70E: the comparison unit 230E may compare the theoretical confidence of each block and consequently determine the image with the maximum theoretical confidence as the dirtiest surface to be treated.

When the cleaning robot is working on the surface to be treated, in Step S80E, the dust sensor 235E may detect such dirt as dust and particles and send the detected dust quantity L to the theoretical confidence correction unit 236E;

In Step S90E, the theoretical confidence correction unit 236E may receive the actual dirt quantity L sent by the dust sensor 235E and compare the actual dirt quantity L with the standard dirt quantity A; according to the functional relation between this difference value and the deviation value of instantaneous confidence, namely $_\Delta F=f(x)=f(L-\lambda)$, the dust sensor 235E may figure out the deviation value of instantaneous confidence $_\Delta F$, where X represents the difference value between actual dirt quantity and standard dirt quantity, namely $(L-\lambda)$; $_\Delta F$ represents the deviation value of instantaneous theoretical confidence, f represents the functional relation expression, and this functional relation expression represents a feedback correction algorithm; After the difference value $_\Delta F$ has been obtained through calculation, the difference value $_\Delta F$ is returned to the theoretical confidence calculation unit 232E, and the theoretical confidence calculation unit 232E may recalculate the theoretical confidence and consequently adjust the theoretical confidence of this block.

The feedback correction algorithm for the deviation value $_\Delta F$ of instantaneous confidence as stated above is obtained according to the mode of comparison between the instantaneous confidence and the dust quantity, and the functional relation between them is the functional relation expression f in $_\Delta F_{A(n)}=f(x)$:

$$_\Delta F_{A(n)}=a_n X^n + a_{n-1}X^{n-1}+a_{n-2}X^{n-2}+\ldots+a_1 X^1 + a_0$$

Wherein, X represents the difference value between actual dirt quantity and standard dirt quantity;

$_\Delta F_{A(n)}$ Represents the deviation value of instantaneous confidence when the characteristic value is A after the nth correction;

$a_n, a_{n-1}, \ldots, a_1, a_0$ represent multiple factors.

According to said functional relation expression, it is feasible to obtain diversified functional relation expressions. As for which kind of functional relation expression should be adopted, the determination depends on the final intention on how to process the effect fed back by the deviation value of dust quantity. For example, as a fixed feedback effect, the corresponding functional relation is $Y=a_1 X^1 + a_0$; as a unfixed feedback effect, the relation between Y and X in the functional relation presents a curve, which is a multivariate function of X, such as quadratic function nth order function etc. The present invention hereby provides the inspiration on the feedback correction algorithm for the deviation value $_\Delta F$ of instantaneous confidence, so that those skilled in the art may flexibly select the optimal functional relation expression according to the actual working environment of robot.

In addition, to avoid the image collection, processing and analysis from entering the state of infinite loop, it is feasible to add upper limit and lower limit for the value range of the instantaneous confidence in the calculation module. When all the values of instantaneous confidence are lower than the lower limit of value range, it is meant that the corresponding surface to be treated has been adequately clean, and it is not necessary for the image collecting module to collect image any more; If, within a preset time period, all the values of instantaneous confidence are higher than the upper limit of the value range, it is meant that the corresponding surface to be treated has been corrected and adjusted for adequate times, and it is necessary to collect the next image.

In the collection of the next image, the instantaneous confidence after the final adjustment of the previous image is the currently instantaneous confidence under this characteristic value.

As compare with the embodiment 4, in this embodiment, when the cleaning robot has moved to the determined working surface for cleaning work, the dust sensor may make detection on the dust quantity on the current working surface, and the recognition device may make adjustment to the current instantaneous confidence. Wherein, the current instantaneous confidence is equivalent to the sum of the previous confidence and the deviation value of instantaneous confidence which is obtained after each time of adjustment.

FIG. 11 is the integral schematic diagram of the self-mobile cleaning robot according to the present invention; FIG. 12 is the bottom schematic diagram of the self-mobile cleaning robot according to the present invention; With reference to FIG. 11 and FIG. 12, the cleaning robot has the function of realizing the active recognition to the dirt, and comprises a robot main body 1, a control unit 2, a drive unit 3, a walking unit 4 and a cleaning unit 5, wherein the control unit 2 may control the cleaning unit 5 in operation and control the drive unit 3, so that the drive unit 3 may drive the walking unit 4 to walk; the cleaning robot also comprises the said dirt recognition device used for determining the dirtiest surface to be treated; according to the dirtiest surface to be treated which is determined by the dirt recognition device, the control unit 2 may determine the walking route of the walking unit 4 with the dirtiest surface to be treated as the destination, so as to make cleaning on the dirtiest surface to be treated.

Wherein, the control unit 2 may control the drive unit 3, so that the drive unit 3 may drive the walking unit 4 (driving wheel, as shown in FIG. 13) to drive the robot main body 1 to move. In order to achieve the function of automatic cleaning, a cleaning unit 5 is provided inside the self-mobile cleaning robot. The cleaning unit 5 comprises relevant parts such as vacuum suction unit and ground brush, which are used for cleaning the surface to be treated. An intake channel is provided at the bottom of the self-mobile cleaning robot main body. Under the driving force of rolling brush and the pull of vacuum, such dirt as dust enter the robot main body 1 through this intake channel. A dust sensor 235E is mounted on both sides of the robot intake channel, and the dust sensor may distinguish the dirt quantity between intake channels.

In addition, the dirt recognition device can be a device independent of the robot control unit 2, or a device having overlapping composition with the control unit 2, namely the image processing module in the dirt recognition device is a component part of control unit 2. Since this recognition device has been described in detail before, the relevant detailed description will be no longer provided herein.

Figure 15A:
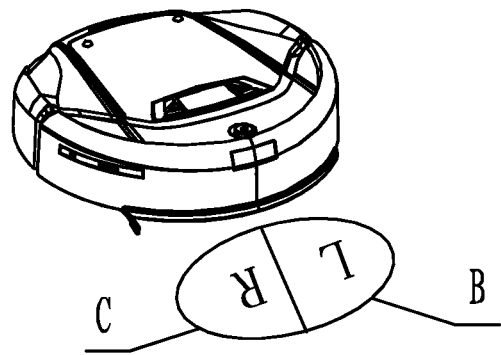
FIG. 15A-15C is the operational schematic diagram of the self-mobile cleaning robot.

How does the cleaning robot with function of active recognition to the dirt realize the active recognition to the dirt as well as its working flow will be described in detail herein. For more clear expression, overall description of this embodiment will be given in combination with specific data and the corresponding attached drawings. The specific example is given as follows:

With reference to FIGS. 11, 12, 13, 14 and 15A-15C, the working flow of the self-mobile cleaning robot is described as follows:

Step S101: The image collecting module 10E (such as pick-up head) set at the head of the cleaning robot may collect image from the surface to be treated in the front of the cleaning robot;

Step S102: The image segmentation unit 210E may divide the image into two blocks, namely left block and right block. As shown in FIG. 15A, two image blocks respectively correspond to area B and area C; the image information of each block is converted into gray-scale value. For example, the left side gray-scale value is 125, while the right side gray-scale value is 180;

Step S103: In the pattern recognition algorithm, the characteristic value extraction unit 231E may convert the gray-scale value into characteristic value and consequently extract the dirt characteristic from each block. For example, the corresponding characteristic values are 0.15 and 0.56;

Step S104: Using the characteristic value and an instantaneous confidence which is obtained from a database and corresponds to the characteristic value as parameters, the theoretical confidence calculation unit 232E may obtain the theoretical confidence corresponding to each block, according to the functional relations among the characteristic value, the instantaneous confidence and the theoretical confidence. Wherein, the data in the database is shown in Table 1; from this table, the theoretical confidence calculation unit may search the instantaneous confidence values $F_{0.15}$ and $F_{0.56}$ when the characteristic values are 0.15 and 0.56. The instantaneous confidence in the initial data base is the initial confidence, and the value of each Initial confidence is the same. In this embodiment, this initial confidence is preset. The confidence is 1, namely $F_{0.15(0)}=F_{0.56(0)}=1$. Under the precondition each characteristic value and instantaneous confidence are given, the theoretical confidence is obtained based on a multiplication relation. The specific conversion relation is as follows: theoretical confidence=characteristic value*instantaneous confidence. In this manner, the image information of each block corresponds to a theoretical confidence. The values of theoretical confidence are respectively: $P_{0.15(0)}=0.15*(1+0)=0.15$; $P_{0.56(0)}=0.56*(1+0)=0.56$.

Figure 15B:
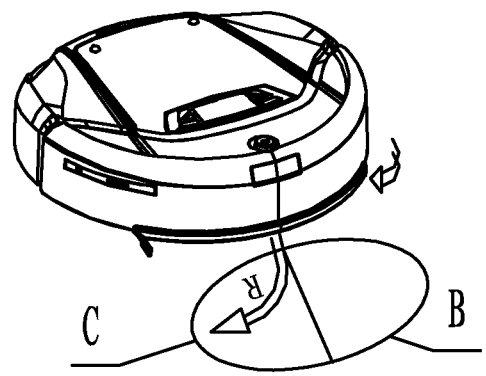
Figure 15C:
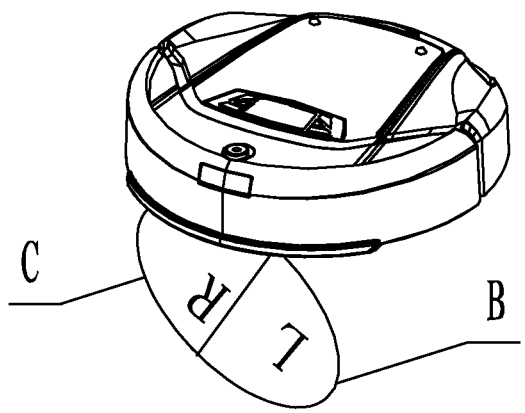

Step S105: Comparing two theoretical confidence values. The maximum value of theoretical confidence is 0.56, so that the right image block is determined as the surface to be treated;

Step S106: The control unit 2 may send control signals to the drive unit 3, so that the drive unit may drive the walking unit 4 to move towards area C, as shown in FIG. 15B, the walking unit may move to this working surface, namely area c; as shown in FIG. 15C, the control unit 2 may control the cleaning unit 5 in operation to make cleaning on this surface. The drive unit 3 may drive the waling unit 4 to move within the area. It is use code or speedometer or other equipment with the similar principle to realize exact positioning.

Step S107: When working on this working surface, the dust sensor 235E may make real-time detection on such dirt as dust and particles, send the actually detected dust quantity $L_{0.56}=700$ to a theoretical confidence correction unit 236E in the recognition unit; the theoretical confidence correction unit 236E may compare the actual dirt quantity $L_{0.56}=700$ with the standard dirt quantity $\lambda=500$. Wherein, the threshold value of the standard dirt quantity A can be flexibly set by the user through a setting unit. After comparison, through the feedback correction algorithm, the theoretical confidence correction unit 236E may figure out the deviation value of instantaneous confidence when the characteristic value is 0.56. $\Delta F_{0.56(1)}=f(L_{0.15}-\lambda)=0.2$;

Step S108: Then, the theoretical confidence calculation unit 232E may recalculate the theoretical confidence when the characteristic value is 0.56, and may adjust the adjusted instantaneous confidence as the current instantaneous confidence under this characteristic value.

Firstly, the instantaneous confidence is calculated, the instantaneous confidence is equivalent to the previous instantaneous confidence plus the deviation value $\Delta F_{(n)}$ of instantaneous confidence after each time of adjustment. In this embodiment, since adjustment is merely made once, $F_{0.56(1)}=$ $F_{0.56(0)} + \Delta F_{0.56(1)} = 1 + 0.2 = 1.2$. In such case, the theoretical confidence corresponding to the characteristic value 0.56 is updated as $P_{0.56(1)} = 0.56 * F_{0.56(1)} = 0.56 * 1.2 = 0.672$.

In this factual data example, for the characteristic value corresponding to the gray-scale value of image, the value range is 0~1; the value range of the corresponding instantaneous confidence is 0~10; the deviation value of instantaneous confidence is any number within 0~1.

Table 1 the corresponding relations between various characteristic values and various instantaneous confidence values

|  | Characteristic value | | | | |
| --- | --- | --- | --- | --- | --- |
|  | 0 | 0.15 | 0.56 | 0.6 | 1 |
| Instantaneous confidence F | $F_{0(n)}$ | $F_{0.15(n)}$ | $F_{0.56(n)}$ | $F_{0.6(n)}$ | $F_{1(n)}$ |
| Initial confidence | 1 | 1 | 1 | 1 | 1 |
| Deviation value of instantaneous confidence $\Delta F$ | $\Delta F_0$ | $\Delta F_{0.15}$ | $\Delta F_{0.56}$ | $\Delta F_{0.6}$ | $\Delta F_1$ |
| Theoretical confidence P | 0 | $0.15 * F_{0.15(n)}$ | $0.56 * F_{0.56(n)}$ | $0.6 * F_{0.6(n)}$ | $F_{1(n)}$ |

According to said description of this embodiment, the initial confidence is preset. In addition to such mode, the initial confidence may also be selected by the user from several options through a setting unit 7, or selected by the user at will from a certain value range (such as: <0 and ≤1), so that each initial confidence, instantaneous confidence and each theoretical confidence can be adjusted and changed correspondingly. Where the standard for determination of theoretical remains unchanged, if the selected value of initial confidence is relatively smaller, the instantaneous confidence and the theoretical confidence that correspond to the characteristic value will become smaller. As a result, in the determination for the active recognition to dirt by means of image, it is believed that this area involves less dirt and the corresponding operation mode can be used for work; if the selected value of initial confidence is relatively bigger, the instantaneous confidence and the theoretical confidence that correspond to the characteristic value will become bigger. As a result, in the determination for the active recognition to dirt by means of image, it is believed that this area involves more dirt and the corresponding operation mode can be used for work.

In addition to said initial confidence that can be adjusted, the dust sensor 235E may also select its standard value of dust quantity or the corresponding cleaning extent through a setting unit 7. The specific values may be selected by the user from several options or selected by the user at will from certain range of value. If the selected standard value of dust quantity is relatively smaller, it is meant that the dust actuated signal is sensitive, and it is easier for the dust sensor to detect such dirt as dust; If the selected standard value of dust quantity is relatively higher, it is meant that the dust actuated signal is dull, it is not easy for the dust sensor to detect such dirt as dust.

In making cleaning on the currently working surface, the cleaning robot may make real-time judgment: (1) whether the electric quantity of its battery is lower than the preset value (Step S109); (2) whether the currently instantaneous confidence values corresponding to all the characteristic values have been converged to 0, namely the lower limit value of the instantaneous confidence (Step S111); (3) If the actual dirt quantity sensed by the dust sensor within a preset time period is less than a set value or the actual dirt quantity sensed by the dust sensor within another preset time period has always been greater than a set value (Step S112); If the electric quantity of battery is lower than the preset value (Step S109), the robot may retain the instantaneous confidence corresponding to all the characteristic values, exit from the current operation state and stop the cleaning work (Step S110); If the currently instantaneous confidence values corresponding to all the characteristic values have converged to 0 (namely the lower limit value of instantaneous confidence), the cleaning robot may clear the instantaneous confidence corresponding to each characteristic value stored in the database, default the initial confidence of characteristic value used in the database as the currently instantaneous confidence of this characteristic value and exit from the current operation state, indicating that all the working surfaces have been cleaned. If the dust quantity detected by the dust sensor is less than the preset threshold value, it is meant that this surface has been adequately clean, and the cleaning robot will return to the step S101 to select the next image; if the dust quantity detected by the dust sensor within a set time period (for example: 10 minutes) has always been more than the preset threshold value, it is meant that this surface cannot be cleaned, the cleaning robot will give up the cleaning on this surface and return step S101 to select the next image.

In this embodiment, the cleaning robot determines where to move based on the theoretical confidence. Of course, the gray-scale value or the characteristic value can also be used as the basis for determination. For the method for determination, refer to said embodiments 2 and 3 of the recognition device for realizing the active recognition to the dirt.

In case of making active recognition to dirt merely based on image information, it is unavoidable that the recognition device will be subject to interferences more or less from external environment, so that the information recognized based on image information is not completely reliable. Accordingly, in this embodiment, the recognition device may divide the collected image information of the surface to be treated into N blocks (N>1), convert the image information of each block into gray-scale value, conduct a series of calculation in turn to obtain the theoretical confidence of each block, compare the value of each theoretical confidence, and take out the maximum value; based on the maximum value, select the block corresponding to the maximum theoretical confidence as the surface to be treated. Then, the dust sensor may make actual detection on the dirties surface to be treated which is determined according to image information, compare the actually detected dust quantity with the preset nominal value of dust, use feedback correction algorithm to constantly correct the instantaneous confidence and thus update the theoretical confidence accordingly.

In this embodiment, said methods are adopted to conduct image collection, information conversion, value extraction, numerical comparison, discrimination of maximum value for the surface to be treated, the dust sensor is used for auxiliary judgment, and feedback correction algorithm is used for data correction and updating, so as to make constant judgment and error correction for the image information of the surface to be treated, effectively improve efficiency and enhance the reliability of information.

In this embodiment, the recognition processing unit used for realizing the image segmentation, information extraction, judgment and calculation is a part in the control unit 2. In the specific embodiment, these functions can be completed by using the hardware and internal control procedures in the control unit or by adopting an independent set of hardware and control procedures. In such case, it is necessary to coordinate with the other control parts in the control unit 2 of robot, so as to complete the cleaning work of robot.

Wherein, the setting unit can be set on the man-machine interaction interface of robot, such as the setting panel 7 as shown in FIG. 11, wherein the press key for setting up the initial confidence and the press key for setting up the threshold value for the standard dust quantity of dust sensor are provided.

Through the setting unit, the initial confidence may also be selected by the user from several options through a setting unit 7, or selected by the user at will from a certain value range (such as: <0 and ≤1), so that each initial confidence, instantaneous confidence and each theoretical confidence can be adjusted and changed correspondingly. Through man-made setting, each initial instantaneous confidence and each initial theatrical confidence can be correspondingly adjusted and changed. Where the standard for determination of theoretical remains unchanged, if the selected value of initial confidence is relatively smaller, the instantaneous confidence and the theoretical confidence that correspond to the characteristic value will become smaller. As a result, in the determination for the active recognition to dirt by means of image, it is believed that this area involves less dirt and the corresponding operation mode can be used for work. In such case, the corresponding operation mode may refer to that the self-mobile cleaning robot may make sector clearing within a small area, or the self-mobile cleaning robot regulate the dust suction power smaller for working through the control unit; If the selected value of initial confidence is relatively bigger, the instantaneous confidence and the theoretical confidence that correspond to the characteristic value will become bigger. As a result, in the determination for the active recognition to dirt by means of image, it is believed that this area involves more dirt and the corresponding operation mode can be used for work. In such case, the corresponding operation mode may refer to that the self-mobile cleaning robot may make spiral clearing within a small area, or the self-mobile cleaning robot may regulate the dust suction power bigger for working through the control unit;

The user may make man-made setting by selecting the threshold value of standard dust quantity or the corresponding cleaning extent (this cleaning extent corresponds to a certain threshold value). The specific values may be selected by the user from several options or selected by the user at will from a certain range of value. If the selected standard value of dust quantity is relatively smaller, it is meant that the dust actuated signal is sensitive, and it is easier for the dust sensor to detect such dirt as dust; If the selected standard value of dust quantity is relatively higher, it is meant that the dust actuated signal is dull, it is not easy for the dust sensor to detect such dirt as dust.

In this embodiment, the setting is made through press key. Of course, knob touch screen or wired or wireless remote control device can also be used for setting.

Said recognition device and cleaning method for realizing active recognition to the dirt can be applicable to various self-mobile robots. According to different built-in functional units in the self-mobile robots, Said recognition device and cleaning method can be used in dust-removal robot or intelligent cleaner.

Finally it must be mentioned as follows: said embodiments are merely used to describe rather than limit the present invention; Although the detail description of the present invention is provided with reference to preferred embodiments, those skilled in the art should understand that all the modifications or equitable substitutions to the present invention without deviation from the spirit and range of present invention shall be covered by the claims of present invention.

What is claimed is:

1. A dirt recognition device of a cleaning robot, comprising;
    an image processing module;
    an image collecting module for collecting image information of a surface to be treated by the cleaning robot and sending the image information to the image processing module;
    wherein the image processing module is configured to divide the collected image information of the surface to be treated into N blocks, wherein N>1, to extract the image information of each block of image and to process the image information in order to determine, based on the processed image information, a dirtiest surface to be treated that corresponds to one of the N blocks, and consequently the cleaning robot can make an active recognition to dirt.

2. The dirt recognition device of the cleaning robot of claim 1, characterized in that the image processing module comprises:
    an image segmentation unit for dividing the collected image information of the surface to be treated by the clean robot into N blocks, wherein N>1; and
    an information extraction unit for extracting the image information of each block of image information and sending the image information to a calculation unit;
    wherein the calculation unit is configured to determine the dirtiest surface to be treated that corresponds to one of the N blocks of image information according to the image information of each block of image information.

3. The dirt recognition device of the cleaning robot of claim 2, characterized in that the information extraction unit is a gray-scale value extraction unit, and the calculation unit is a comparison unit and wherein:
    the gray-scale value extraction unit is configured to extract the gray-scale value corresponding to each block of the image information; and
    the comparison unit is configured to compare the gray-scale value of each block of image, so as to determine the image information with a maximum gray-scale value as the dirtiest surface to be treated.

4. The dirt recognition device of the cleaning robot of claim 2, characterized in that, the information extraction unit is a gray-scale value extraction unit and the calculation unit comprises a characteristic value extraction unit and a comparison unit:
    wherein the gray-scale value extraction unit is configured to extract the gray-scale value corresponding to each block of image information;
    wherein the characteristic value extraction unit is configured to convert the gray-scale value of each block of image information into a characteristic value corresponding to the gray-scale value, so as to extract a dirt characteristic value from each block of image information; and
    wherein the comparison unit is configured to compare the dirt characteristic value of each block of image information, so as to determine the image information with a maximum dirt characteristic value as the dirtiest surface to be treated.

5. The dirt recognition device of the cleaning robot of claim 2, characterized in that, the information extraction unit is a gray-scale value extraction unit and the calculation unit comprises a characteristic value extraction unit, a theoretical confidence calculation unit and a comparison unit;

wherein the gray-scale value extraction unit is configured to extract a corresponding gray-scale value from each block of image information;

wherein the characteristic value extraction unit is configured to convert the gray-scale value of each block into a characteristic value corresponding to the gray-scale value, so as to extract a dirt characteristic from each block of image information;

wherein, using the characteristic value and an instantaneous confidence which is obtained from a database and corresponds to the characteristic value as parameters, the theoretical confidence calculation unit is configured to obtain a theoretical confidence corresponding to each block of image information, according to functional relations among the characteristic value, the instantaneous confidence and the theoretical confidence, wherein the functional relations among the characteristic value, the instantaneous confidence and the theoretical confidence are described as follows:

$$P_A = AF_A$$

wherein, A represents the characteristic value, $F_A$ represents the instantaneous confidence of the characteristic value A, and $P_A$ represents the theoretical confidence of the characteristic value A; and wherein the comparison unit is configured to compare the theoretical confidence of each block of image information, so as to determine the image information with a maximum theoretical confidence as a dirtiest surface to be treated.

6. The dirt recognition device of the cleaning robot of claim 5, characterized in that, the dirt recognition device also comprises a memory device bearing the database, and the database stores the characteristic value, the instantaneous confidence, the initial confidence and the theoretical confidence which correspond to each other, and the value of the instantaneous confidence corresponding to an initial characteristic value is equivalent to a value of initial confidence.

7. The dirt recognition device of the cleaning robot of claim 2, characterized in that, the information extraction unit is a gray-scale value extraction unit and the calculation unit comprises a characteristic value extraction unit, a theoretical confidence calculation unit and a comparison unit, and the dirt recognition device also comprises:

a dust sensor for sensing a dirt quantity on the surface to be treated and sending information on the sensed dirt quantity to a theoretical confidence correction unit configured to calculate out a difference value between actual dirt quantity and standard dirt quantity, and further configured to calculate out a deviation value of instantaneous confidence according to the functional relation between the difference value and the deviation value of instantaneous confidence;

wherein the gray-scale value extraction unit is configured to extract the corresponding gray-scale value from each block of image information, wherein the characteristic value extraction unit is configured to convert the gray-scale value of each block into a characteristic value corresponding to the gray-scale value, so as to extract the dirt characteristic from each block of image information, wherein, according to the functional relations among the characteristic value, an instantaneous confidence, which is obtained from a database and corresponds to the characteristic value, and the deviation value of instantaneous confidence, the theoretical confidence calculation unit is configured to calculate out a theoretical confidence corresponding to each block of image information after correction, and wherein the comparison unit is configured to compare the theoretical confidence of each block of image information after correction and determine the image information with a maximum theoretical confidence as a dirtiest surface to be treated.

8. The dirt recognition device of the cleaning robot of claim 7, characterized in that, the functional relation between the difference value of actual dirt quantity and standard dirt quantity and the deviation value of instantaneous confidence is described as follows:

$$\Delta F_{A(n)} = f(x)$$

wherein X represents the difference value between actual dirt quantity and standard dirt quantity, $\Delta F_{A(n)}$ represents the deviation value of instantaneous confidence when the characteristic value is A after nth correction, and f represents the functional relation expression;

wherein, based on the following formula, the theoretical confidence calculation unit is configured to calculate out the theoretical confidence corresponding to each block of image information after correction:

$$P_{A(n)}' = A(F_A + \Delta F_{A(n)} + \Delta F_{A(n-1)} + \ldots \Delta F_{A(1)})$$

wherein, A represents the characteristic value, $F_A$ represents the instantaneous confidence when the characteristic value is A, $\Delta F_{A(n)}$ represents the deviation value of instantaneous confidence that corresponds to the difference value between actual dirt quantity and standard dirt quantity at the time of nth correction, $\Delta F_{A(n-1)}$ represents the deviation value of instantaneous confidence that corresponds to the difference value between actual dirt quantity and standard dirt quantity at the time of (n−1)th correction, $\Delta F_{A(1)}$ represents the deviation value of instantaneous confidence that corresponds to the difference value between actual dirt quantity and standard dirt quantity at the time of the 1st correction, and $P_{A(n)}'$ represents the theoretical confidence when the characteristic value is A after the nth correction.

9. The dirt recognition device of the cleaning robot of claim 8, characterized in that, the functional relation expression of f in $\Delta F_{A(n)} = f(x)$ is represented as follows:

$$\Delta F_{A(n)} = a_n X^n + a_{n-1} X^{n-1} + a_{n-2} X^{n-2} + \ldots + a_1 X^1 + a_0$$

wherein, X represents the difference value between actual dirt quantity and standard dirt quantity, $\Delta F_{A(n)}$ represents the deviation value of instantaneous confidence when the characteristic value is A after the nth correction, and $a_n$ through $a_0$ represent multiple factors.

10. The dirt recognition device of the cleaning robot of claim 7, characterized in that, the dirt recognition device also comprises a memory device bearing the database, and the database stores the characteristic value, the instantaneous confidence, an initial confidence, the deviation value of instantaneous confidence, the theoretical confidence and a threshold value of standard dirt quantity which correspond to each other, and the value of the instantaneous confidence corresponding to an initial characteristic value is equivalent to a value of initial confidence.

11. The dirt recognition device of the cleaning robot of claim 7, characterized in that, the dirt recognition device also comprises a setting unit, which may be used for setting up an initial confidence, a threshold value of standard dirt quantity, or both the initial confidence and the threshold value of standard dirt quantity, and the setting unit is a press key, a knob, a touch or remote control type device.

12. A cleaning robot, comprising:
   a robot main body;
   a control unit;
   a drive unit;
   a walking unit;
   a cleaning unit, and
   a dirt recognition device comprising an image processing module and an image collecting module for collecting image information of a surface to be treated by the cleaning robot and sending the image information to the image processing module, the image processing module being configured to divide the collected image information of the surface to be treated into N blocks, wherein N>1, to extract the image information of each block of image and being configured to process the image information in order to determine, based on the processed image information, a dirtiest surface to be treated that corresponds to one of the N blocks, and consequently the cleaning robot can make an active recognition to dirt,
   wherein the control unit is further configured to control the cleaning unit in operation and control the drive unit, so that the drive unit drives the walking unit to walk, according to the dirtiest surface to be treated, which is determined by the dirt recognition device, and wherein the control unit is further configured to determine a walking route of the walking unit with the dirtiest surface to be treated as a destination, so as to prioritize cleaning on the dirtiest surface to be treated.

13. A cleaning method of a cleaning robot, characterized in that the cleaning method comprises the following steps:
   Step 1: using an image collecting module to collect image information of the surface to be treated by the cleaning robot;
   Step 2: using an image processing module to divide the image information into a plurality of blocks and to convert the image information of each block of image information into a gray-scale value;
   Step 3: the image processing module may determine a dirtiest surface to be treated according to the gray-scale value; and
   Step 4: driving the cleaning robot to walk to the dirtiest surface to be treated and make cleaning on the dirtiest surface to be treated.

14. The cleaning method of the cleaning robot of claim 13, characterized in that step 3 specifically comprises the following steps:
   Step 301: converting the gray-scale value of each block of image information into a characteristic value corresponding to the gray-scale value, thus extracting dirt characteristics from each block of image information; and
   Step 302: comparing the characteristic value of each block of image information, and determining the block with a maximum characteristic value as the dirtiest surface to be treated.

15. The cleaning method of the cleaning robot of claim 13, characterized in that step 3 specifically comprises the hereinafter steps:
   Step 311: converting the gray-scale value of each block into a characteristic value corresponding to the gray-scale value;
   Step 312: according to functional relations among the characteristic value, an instantaneous confidence and a theoretical confidence, obtaining a theoretical confidence that corresponds to each block; and Step 313: comparing the theoretical confidence of each block, and determining the block with the maximum theoretical confidence as the dirtiest surface to be treated.

16. The cleaning method of the cleaning robot of claim 15, characterized in that, the functional relation among the characteristic value, the instantaneous confidence and the theoretical confidence as stated in step 312 is as follows:

$$P_A = AF_A$$

wherein, A represents the characteristic value, $F_A$ represents the instantaneous confidence when the characteristic value is A, and $P_A$ represents the theoretical confidence when the characteristic value is A.

17. The cleaning method of the cleaning robot of claim 15, characterized in that, the cleaning method also comprises the following steps after step 4:
   Step 5: sensing a dirt quantity on a treating surface through a dust sensor;
   Step 6: calculating a difference value between actual dirt quantity and standard dirt quantity; and
   Step 7: according to the functional relation between the difference value and a deviation value of instantaneous confidence, calculate out the deviation value of instantaneous confidence, and then return to step 312, wherein the functional relation between the difference value (between actual dirt quantity and standard dirt quantity) and the deviation value of instantaneous confidence is expressed as follows:

$$\Delta F_{A(n)} = f(x)$$

wherein x represents the difference value between actual dirt quantity and standard dirt quantity and $\Delta F_{A(n)}$ represents the deviation value of instantaneous confidence after the nth correction, and f represents the functional relation expression;
   wherein the functional relation among the characteristic value, the instantaneous confidence and the theoretical confidence in step 312 is as follows:

$$P_{A(n)}' = A(F_A + \Delta F_{A(n)} + \Delta F_{A(n-1)} + \cdots \Delta F_{A(1)})$$

wherein, A represents the characteristic value, $F_A$ represents the instantaneous confidence when the characteristic value is A, $\Delta F_{A(n)}$ represents the deviation value of instantaneous confidence that corresponds to the difference value between actual dirt quantity and standard dirt quantity at the time of nth correction, $\Delta F_{A(n-1)}$ represents the deviation value of instantaneous confidence that corresponds to the difference value between actual dirt quantity and standard dirt quantity at the time of (n−1)th correction, $\Delta F_{A(1)}$ represents the deviation value of instantaneous confidence that corresponds to the difference value between actual dirt quantity and standard dirt quantity at the time of the 1st correction, and $P_{A(n)}'$ represents the theoretical confidence when the characteristic value is A after the nth correction.

18. The cleaning method of the cleaning robot of claim 17, characterized in that, the functional relation expression of f in $\Delta F_{A(n)} = f(x)$ is:

$$\Delta F_{A(n)} = a_n X^n + a_{n-1} X^{n-1} + a_{n-2} X^{n-2} + \ldots + a_1 X^1 + a_0$$

wherein, X represents the difference value between actual dirt quantity and standard dirt quantity, $\Delta F_{A(n)}$ represents the deviation value of instantaneous confidence when the characteristic value is A after the nth correction, and $a_n$ through $a_0$ represent multiple factors.

19. The cleaning method of the cleaning robot of claim 17, characterized in that, in the step 4, in making cleaning on the dirtiest surface to be treated, if the actual dirt quantity sensed by the dust sensor within a preset time period is less than a set value or the actual dirt quantity sensed by the dust sensor within another preset time period has been greater than a set value, terminating the cleaning on the treated surface and returning to step 1.

20. The cleaning method of the cleaning robot stated in claim 15, characterized in that, the cleaning method also comprises the following step:
    detecting whether all instantaneous confidence values have converged to a low limit value within a value range of instantaneous confidence and, if all the instantaneous confidence values have converged to the low limit value within the value range of instantaneous confidence, stopping cleaning work.

\* \* \* \* \*